United States Patent

[11] 3,540,402

[72] Inventor Maurice L. Kocher
 Granite Falls, Minnesota
[21] Appl. No. 771,398
[22] Filed Oct. 29, 1968
[45] Patented Nov. 17, 1970
[73] Assignee Parker-Hannifin Corporation
 Cleveland, Ohio
 a corporation of Ohio

[54] LIQUID DISPENSING DEVICE
 16 Claims, 2 Drawing Figs.
[52] U.S. Cl. .................................................. 141/198,
 137/454, 137/588, 141/292, 141/308, 222/153,
 222/484, 251/353
[51] Int. Cl. .................................................. B65b 1/30,
 B67d 5/37
[50] Field of Search .......................................... 141/291-
 308. 192. 198; 222/Inquired. 153. 484; 251/Inquired.
 353; 137/Inquired. 454. 588; 136/Inquired

[56] References Cited
 UNITED STATES PATENTS
 3,207,190 9/1965 Silbereis et al ............... 141/198

Primary Examiner—Houston S. Bell, Jr
Attorney—John N. Wolfram

ABSTRACT: A liquid dispensing device for filling receivers, such as electric storage battery cells, with a liquid, the device having a valved passage for liquid that shuts off at the external end thereof to prevent dripping when closed and having a valved vent passage that shuts off at the internal end thereof to prevent entrance of liquid therein, and there is a separate spring for each valve to effect shutoff thereof. Liquid flow is automatically shut off while the valves are open when liquid in the receiver reaches the vent passage.

Patented Nov. 17, 1970

3,540,402

INVENTOR
MAURICE L. KOCHER

John N. Wolfram
ATTORNEY

LIQUID DISPENSING DEVICE

BACKGROUND OF THE INVENTION

Water jugs with a liquid dispensing device attached thereto are used in gasoline stations for filling batteries with water. Such dispensing devices that include a stem with vent and liquid passages therethrough and wherein the stem is insertable into the battery to the desired level of fill whereby discharge of water into the battery automatically ceases when the water level in the battery reaches the stem are known and are shown, for example, in U.S. Pat. No. 2,963,205. In such prior devices the vent and liquid passages are valved closed upon removal of the device from the battery but the valving arrangements are such that dribbling of water from the dispenser can occur after initial shutoff caused by closing of the vent passage by the water level in the battery.

SUMMARY OF THE INVENTION

This invention arranges the valving for the liquid passage in the dispenser so that this passage is shut off by its valve at its lower end whereby liquid in the passage can drain only into the container. The valving for the vent passage shuts off this vent passage at its upper end so that at no time will liquid enter the vent passage. Furthermore this dispenser is so constructed that it is easy to assemble and disassemble, as for repair, and provides soft valve seals for leak proof shutoff.

DESCRIPTION

Figures 1, 2:
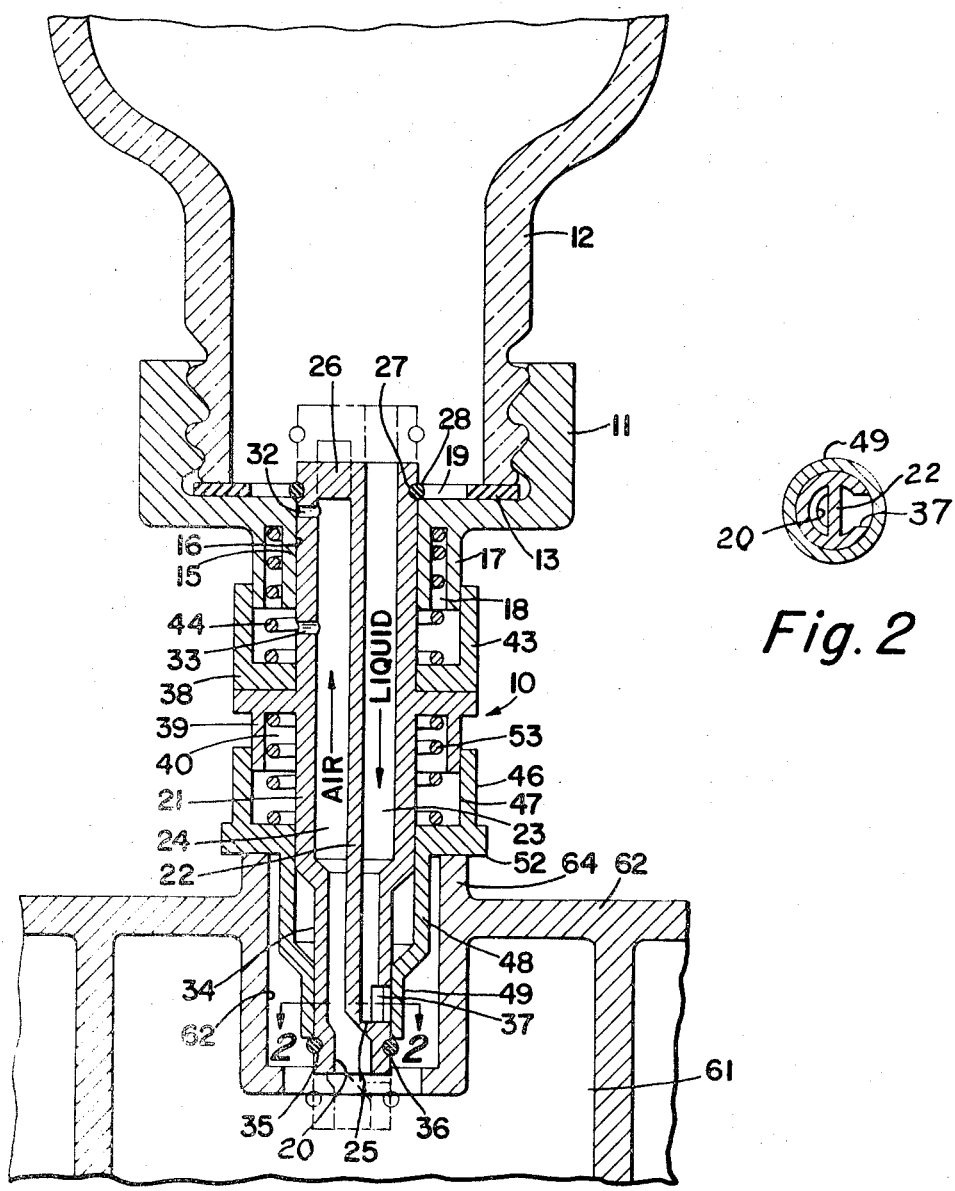
FIG. 1 is a vertical cross section through the dispenser and a portion of a battery and showing the dispenser in the closed position.
FIG. 2 is a section view on lines 2–2 of FIG. 1.

The dispenser 10 has a body 11 threadedly attached to a jug 12 and sealed by a packing washer 13. Body 11 has a depending tube 15 with a cylindrical bore 16 and has a tubular skirt 17 spaced from tube 15 to form an annular recess 18 and has a transverse valve seat 19.

Slidably mounted within bore 16 and having a close fit with tube 15 is a tubular stem 21 having a central wall 22 that divides the interior into a passage 23 for liquid and a vent passage 24 for air. Liquid passage 23 is open to the upper end of the stem and is closed at its lower end by a lower transverse wall 25. Vent passage 24 is open at its lower end and is closed at its upper end by an upper transverse wall 26. The upper end of the stem has an annular groove 27 that carries a resilient O-ring 28 that projects from the groove so as to form an upper valve face engageable with valve seat 19. Below O-ring 28 the stem has a transverse opening 32 that is within tube 15 when the dispenser is closed and that is within the container 12 when the dispenser is open. Spaced from opening 32 is another transverse opening 33 that is below tube 15 when the dispenser is closed and is within the tube when the dispenser is open.

At its lower stem 21 has a reduced diameter portion 34 and a groove 35 that carries a resilient O-ring 36 that projects from the groove to form a lower valve face. It also has a transverse opening 37 connecting liquid passage 23 to its exterior.

Intermediate its ends stem 21 has a radially projecting flange that has a depending tubular skirt 39 spaced from the stem to form a recess 40. Mounted on the upper portion of stem 21 is an upper sleeve 43 that is pressed by an upper spring 44 against flange 38 and which has a telescoping slide fit with skirt 17.

A valve sleeve 46 is slidably mounted on the lower end of stem 21 and it has a first cylindrical portion 47 telescoped with a slide fit over skirt 39, a second cylindrical portion 48 telescoped with a slide fit over stem 21, and a third cylindrical portion 49 telescoped with a slide fit over reduced diameter portion 34 of the stem. These multiple slide fits provide great stability for operation of valve sleeve 46 upon stem 21 to prevent cocking and sticking of the valve sleeve up on the stem, as would otherwise easily occur if flange 52 is not squarely seated upon cell neck 64 when the dispenser parts are moved toward open position. The lower end of valve sleeve 46 provides a valve face engageable with O-ring 36 and a transverse flange 52 is engaged by a lower spring 53 that urges valve sleeve 46 toward seated position relative to O-ring 36.

In use the dispenser 10 is attached to a container 12 for liquid, as shown. When it is desired to fill a cell 61 of a battery 62, the container is inverted and the lower end of the dispenser is inserted into cell opening 62 until flange 52 butts against filler neck 64. At this time valve sleeve 46 is seated against O-ring 36 to close liquid passage 23 and O-ring 28 is against seat 19 to close vent passage 24.

Jug 12 is now pressed toward battery 62 causing spring 53, which is identical to spring 44, to collapse and stem 21 to move downwardly until skirt 47 strikes flange 38 and the lower end of the stem is in the dotted position shown in which O-ring 36 is away from the lower end of the valve sleeve 46 and opening 37 is below the latter to expose liquid passage 23 to the interior of the battery.

Downward movement of jug 12 also causes spring 44 to collapse so that body 11 moves downwardly relative to stem 21 and causing the upper end of stem 21 to assume the position shown by dotted lines in FIG. 1. In this position O-ring 28 and opening 32 are above seat 19 to open vent passage 24 to the interior of jug 12 and to bring passage 33 within tube 15 to substantially close passage 33.

As soon as passage 32 is above seat 19 air from within battery cell 61 flows upwardly through passage 24 into jug 12 and liquid from the latter flows downwardly through passage 23 into the cell. When the liquid level in cell 61 reaches the lower end of vent passage 24 venting of the cell into the jug discontinues and this causes further discharge of liquid from jug 12 to the cell to also discontinue.

Lifting of the jug away from the battery results in the extension of spring 44 to cause engagement of O-ring 28 with seat 19 for closing vent passage 24 relative to the jug interior and in the extension of spring 53 to cause valve sleeve 46 to engage O-ring 36 for closing liquid passage 23. These closing actions prevent dribbling of any liquid from the jug through either of the passages 23, 24 to the dispenser exterior when the dispenser is removed from the battery. Moreover, liquid passage 23 remains filled with liquid for immediate discharge therefrom the next time the dispenser is inserted into a battery and vent passage 24 remains clear of liquid for immediate resumption of its venting functions.

By having passages 32 and 37 immediately adjacent the respective O-rings 28, 36 the same are opened and closed with a minimum of travel of the parts and therefor the overall length of the stem may be minimized.

O-ring 28 serves both as a valve seat and as a retainer for stem 21 upon body 11. Likewise, O-ring 36 serves both as a valve seat and as a retainer for valve sleeve 46 upon stem 21. The parts may thus be quickly assembled or disassembled, and/or either O-ring replaced, by removing the respective O-ring when the same is moved to its open position by manually causing collapse of the respective springs 44, 53. Of course, body 11 must be detached from jug 12 to replace O-ring 28.

Air passage 24 is slanted at its lower end to connect with a circular portion 20 that is centrally located in the lowermost portion of stem 21 to provide a relatively large opening to the exterior that minimizes the possibility of being momentarily closed by splashing of the liquid.

I claim:

1. A dispenser having a body with a bore therethrough and having means for attachment to a container having liquid therein with said bore in communication with the interior of the container, a seat on the body surrounding the bore, a stem slidably mounted in the bore and having an upper valve face engageable with the seat for closing the bore and having a lower valve face, said stem having a passage for liquid that is constantly open at the upper end of the stem and that terminates short of the lower end of the stem, said stem also having a vent passage that is constantly open at the lower end of the stem and that terminates short of the upper end, a first transverse passage in the stem below said valve face and connecting the upper end of the vent passage with the exterior of the stem, and a second transverse passage in the lower end of the stem connecting the liquid passage with the stem exterior, a flange on the stem, an upper spring between the flange and body urging the stem downwardly to a position in which said upper valve face engages the seat to close said bore, a valve sleeve on the lower end of the stem and having a flange, a lower spring between the valve sleeve and the stem urging the sleeve to a position in which it engages the lower valve face for closing the second transverse passage, the valve sleeve having a portion engageable with a receiver, said springs being compressible by movement of the container toward the receiver when said flange is in engagement with the receiver whereby upon compression of the lower spring the lower end of the stem moves downwardly relative to the valve sleeve to open the second transverse passage to the receiver and upon compression of the upper spring the body moves downwardly relative to the stem to open the bore to the container.

2. The dispenser of claim 1 in which the first transverse passage is below said body seat when the upper spring is extended and is below said body seat when the upper spring is compressed.

3. The dispenser of claim 1 in which there is a valve face on the stem below said second transverse opening and engageable by the valve sleeve for closing said second transverse opening.

4. The dispenser of claim 1 in which the lower spring is substantially identical to the upper spring whereby the second transverse passage is opened to connect the container to the receiver via said liquid passage at substantially the same time that said bore is opened to the container.

5. The dispenser of claim 1 in which there is a third transverse passage in the stem spaced below said bore and connecting the air passage to atmosphere exteriorly of the stem when the upper spring is extended and movable into said bore for substantially closing the same when the upper spring is compressed.

6. The dispenser of claim 1 in which said upper valve face comprises a resilient ring carried by the stem.

7. The dispenser of claim 1 in which the lower end of the stem carries a resilient ring engageable by the valve sleeve for closing said second transverse opening.

8. The dispenser of claim 1 in which said valve sleeve has a first portion with a diameter larger than that of a tubular opening in the receiver, a second portion of a reduced diameter slightly smaller than the tubular opening and receivable therein, and a third portion of still further reduced diameter below the second portion and receivable within the tubular opening with substantial clearances, and said third portion encircling said second transverse opening when the latter is closed.

9. The dispenser of claim 1 in which the air passage opens to the exterior of the stem at the lower end of the stem below said second transverse opening whereby the liquid in the receiver will close the air passage without closing the second transverse passage.

10. The dispenser of claim 3 in which said stem has a groove at its upper and lower ends and there is a resilient ring in each groove and projecting therefrom to constitute said upper and lower valve faces, respectively.

11. The dispenser of claim 10 in which the stem at its upper and lower ends has substantially the same diameter on opposite sides of said grooves whereby the resilient rings may be removed from the respective end of the stem.

12. The dispenser of claim 10 in which said resilient ring at the upper end of the stem retains the stem within said body and the resilient ring at the lower end of the stem retains the valve sleeve upon the stem.

13. The dispenser of claim 8 in which said stem has cylindrical portions corresponding in diameter with two of said valve sleeve portions slidably engaged therewith.

14. The dispenser of claim 8 in which said stem has three cylindrical portions corresponding in diameter with said valve sleeve portions and slidably engaged therewith.

15. The dispenser of claim 1 in which the vent passage has an enlargement where it is constantly open at the lower end of the stem.

16. The dispenser of claim 1 in which the vent passage emerges centrally through a bottom face of the stem.